United States Patent [19]

Takagi et al.

[11] Patent Number: 5,576,800
[45] Date of Patent: Nov. 19, 1996

[54] CAMERA HAVING AN AUXILIARY PHOTOGRAPHING FUNCTION

[75] Inventors: Tadao Takagi, Yokohama; Hiroyuki Iwasaki, Kawasaki, both of Japan

[73] Assignee: Nikon Corporation, Tokyo, Japan

[21] Appl. No.: 554,869

[22] Filed: Nov. 7, 1995

Related U.S. Application Data

[63] Continuation of Ser. No. 376,433, Jan. 23, 1995, abandoned, which is a continuation of Ser. No. 156,927, Nov. 24, 1993, abandoned, which is a continuation of Ser. No. 968,053, Oct. 28, 1992, abandoned.

[30] Foreign Application Priority Data

Nov. 21, 1991 [JP] Japan .................................. 3-306300

[51] Int. Cl.$^6$ ...................................... G03B 7/08
[52] U.S. Cl. ........................ 396/238; 396/242; 396/213
[58] Field of Search ................................ 354/432, 441, 354/442, 443, 433, 434

[56] References Cited

U.S. PATENT DOCUMENTS

| | | | |
|---|---|---|---|
| 4,480,902 | 11/1984 | Kawamura | 354/434 |
| 4,525,054 | 6/1985 | Someya et al. | 354/443 |
| 4,536,074 | 8/1985 | Someya et al. | 354/442 |
| 4,616,916 | 10/1986 | Someya et al. | 354/442 |
| 4,636,054 | 1/1987 | Saegusa | 354/432 |
| 4,673,277 | 6/1987 | Someya et al. | 354/442 |
| 4,763,156 | 8/1988 | Ishikawa et al. | 354/442 |
| 4,769,668 | 9/1988 | Ishikawa et al. | 354/442 |
| 4,965,620 | 10/1990 | Takagi et al. | 354/416 |
| 5,005,047 | 4/1991 | Fujino et al. | 354/442 |

FOREIGN PATENT DOCUMENTS 57-84441  5/1982  Japan .

*Primary Examiner*—Russell E. Adams
*Attorney, Agent, or Firm*—Shapiro and Shapiro

[57] ABSTRACT

A camera having an auxiliary photographing function comprises photometering device for photometering an area to be photographed, exposure value calculation device for calculating an exposure value in accordance with the output of said photometering device, photographing mode selection device for selecting a photographing mode, and exposure value setting device for setting a final exposure value in accordance with the mode selected by said photographing mode selection device and the exposure value calculated by said exposure value calculation device.

8 Claims, 15 Drawing Sheets

| MODE | DISP | STAT LIT | FL LIT | PROG DIAG ||
|---|---|---|---|---|---|
| | | | | NATR LIT | FL LIT |
| SILHOUETTE | SE | AMP - 1 | INHB FL | P - 1 | |
| SCENE | LS | AMP - 2 | | P - 2 | |
| SPORTS | SP | | | P - 3 | |
| PORTRAIT | PR | AMP - 3 | SB - 1 | P - 4 | P - 7 |
| MEMORIAL PHOTO | PF | | | P - 5 | |
| CLOSE UP | CU | | | P - 6 | |

| MODE | DISP | STAT LIT | FL LIT | PROG DIAG ||
|---|---|---|---|---|---|
| | | | | NATR LIT | FL LIT |
| SILHOUETTE | SE | AMP - 1 | INHB FL | P - 1 | |
| SCENE | LS | AMP - 2 | | P - 2 | |
| SPORTS | SP | | | P - 3 | |
| PORTRAIT | PR | AMP - 3 | SB - 1 | P - 4 | P - 7 |
| MEMORIAL PHOTO | PF | | | P - 5 | |
| CLOSE UP | CU | | | P - 6 | |

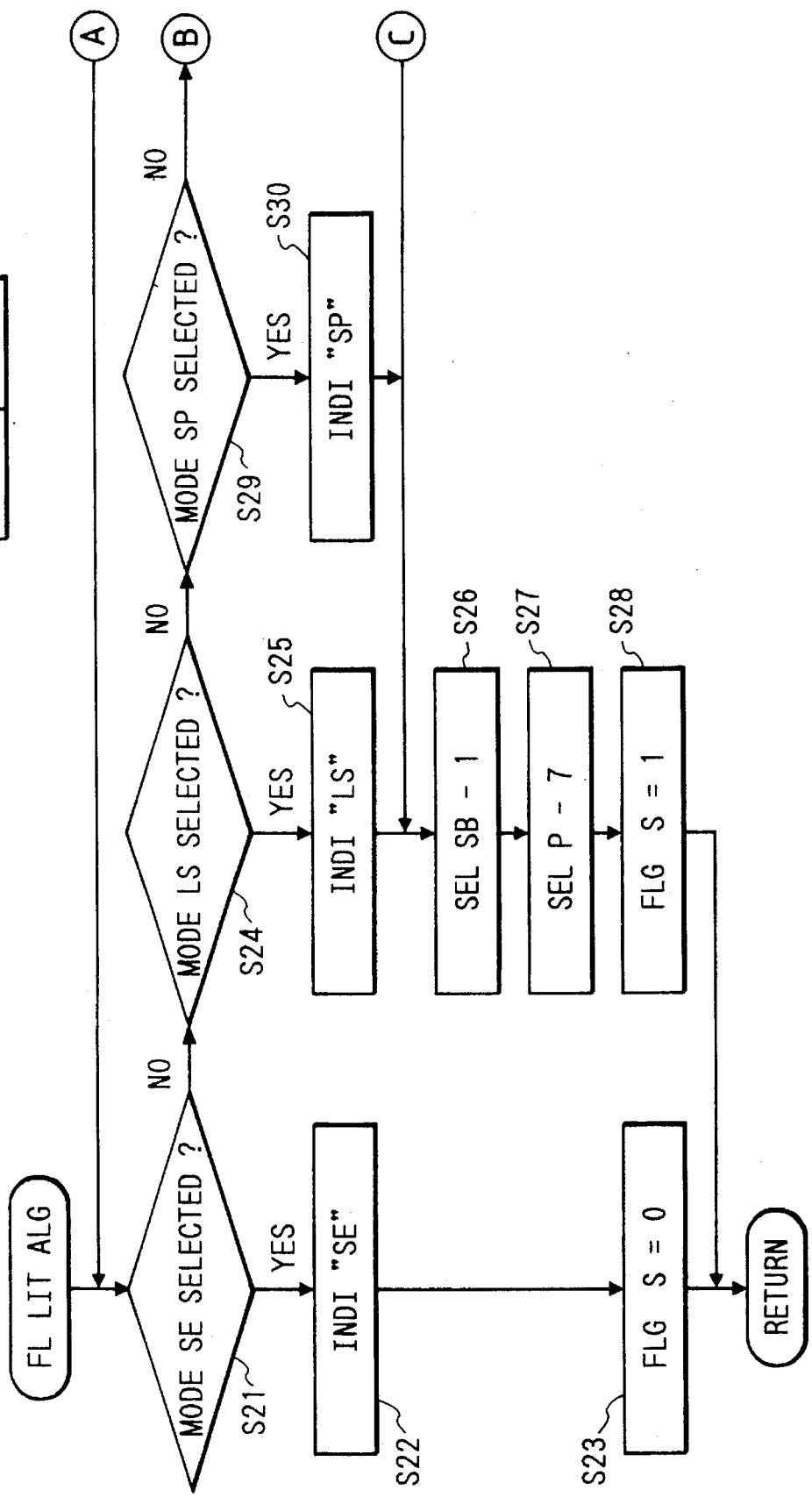

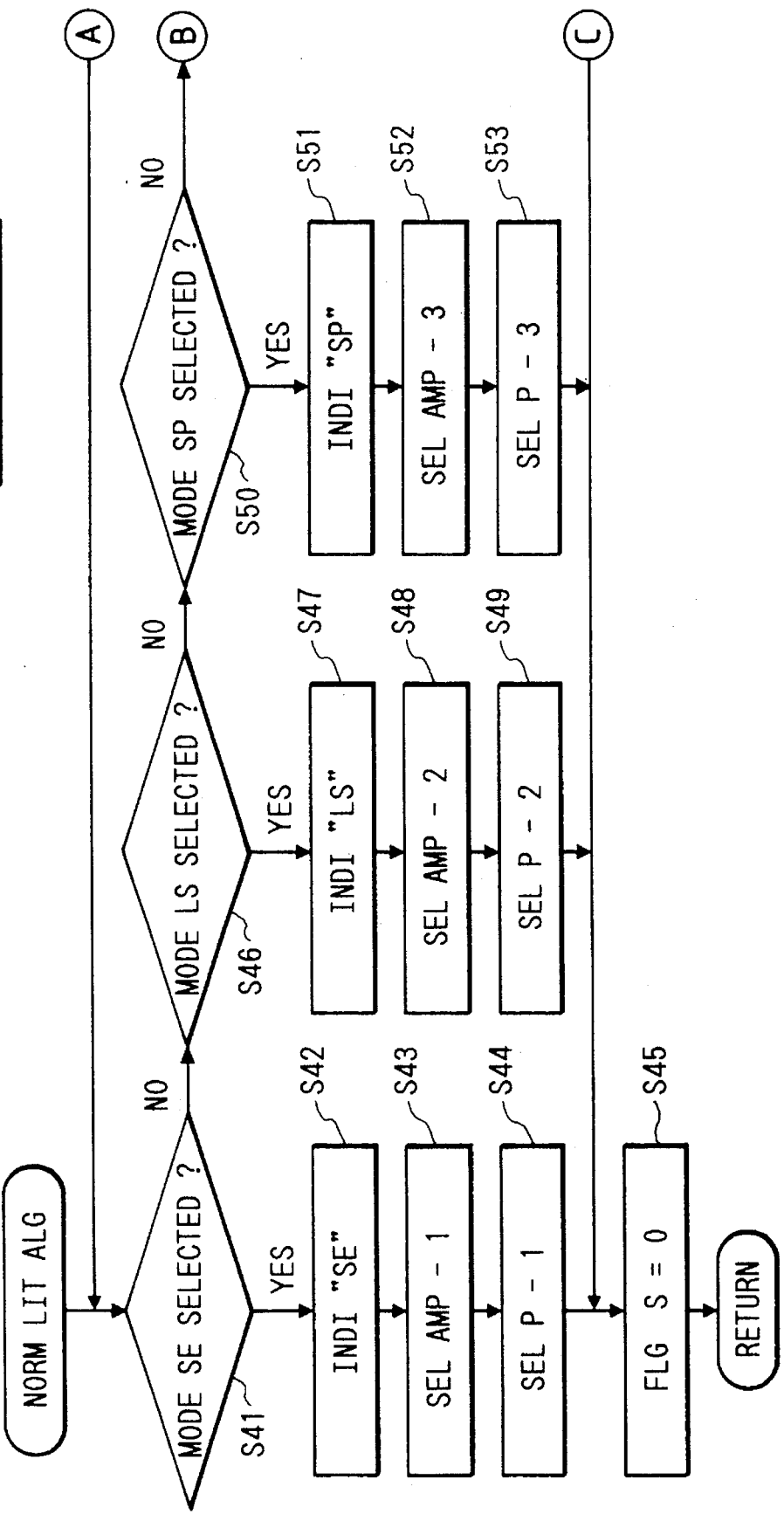

CAMERA HAVING AN AUXILIARY PHOTOGRAPHING FUNCTION

This is a continuation of application Ser. No. 08/376,433, filed Jan. 23, 1995 (now abandoned), which is a continuation of application Ser. No. 08/156,927 filed Nov. 24, 1993 (abandoned), which is a continuation of application Ser. No. 07/968,053 filed Oct. 28, 1992 (abandoned).

BACKGROUND OF THE INVENTION

1. Field of the Invention

The present invention relates to a camera having an auxiliary photographing function to assure proper exposure for a selected photographing scene.

2. Related Background Art

Japanese Laid-Open Patent Application No. 57-84441 discloses a camera having an auxiliary photographing function to assure proper exposure for a selected photographing scene such as scenery or portrait.

In the disclosed camera having the auxiliary photographing function, the weighting for the divisional photometering when an object to be photographed is scenery/counter-light/figure is manually selected among mean photometering, spot photometering, and center weighted photometering so that proper exposure is assured for the photographing scene.

However, in the prior art camera having the auxiliary photographing function, a satisfactory result is not always attained even if the proper exposure for the scenery or silhouette is calculated by the weighting method.

A reason therefor is that the exposure calculated by the weighting method is at a middle of a maximum value and a minimum value of the divisional photometered values and it cannot exceed that range.

More specifically, for the scenery scene, slightly under exposure is usually preferable, and for the silhouette scene, it is a primary requirement to make an object black. Accordingly, it is necessary to select an exposure which is beyond the range defined by the maximum value and the minimum value of the divisional photometering.

SUMMARY OF THE INVENTION

It is an object of the present invention to provide a camera having an auxiliary photographing function to assure proper exposure for scenery scene or silhouette scene.

The camera having an auxiliary photographing function of the present invention comprises: photometering means for photometering an area to be photographed; exposure value calculation means for calculating an exposure value in accordance with the output of said photometering means; photographing mode selection means for selecting a photographing mode; and exposure value setting means for setting a final exposure value by adding or subtracting a predetermined value to or from the exposure value calculated by said exposure value calculation means in accordance with the mode selected by said photographing mode selection means.

In the camera having the auxiliary photographing function of the present invention, the photometering means photometers by dividing the area to be photographed.

In the camera having the auxiliary photographing function of the present invention, the predetermined value to be added or subtracted by the exposure value setting means is determined based on a constant predetermined for each mode to be selected by said photographing mode selection means.

In the camera having the auxiliary photographing function of the present invention, the exposure value calculation means combines an exposure value derived by finely dividing the area to be photographed and an exposure value derived by coarsely dividing the area in accordance with a contribution factor determined by a photographing distance, a brightness difference and a maximum brightness, and the predetermined value to be added or subtracted by the exposure value setting means is determined based on the contribution factor for each mode selected by the photographing mode selection means.

In the camera having the auxiliary photographing function of the present invention, the predetermined value is added or subtracted by the exposure value setting means when the scenery mode is selected by the photographing mode selection means.

In the camera having the auxiliary photographing function of the present invention, the predetermined value is added or subtracted by the exposure value setting means when the silhouette mode is selected by the photographing mode selection means.

In accordance with the camera having the auxiliary photographing function of the present invention, the predetermined value is added to or subtracted from the normal exposure value in accordance with the selected photographing mode to determine the final exposure value.

In accordance with the camera having the auxiliary photographing function of the present invention, the photometering is effected by dividing the area to be photographed into a plurality of areas, and the final exposure value may exceed the range defined by the maximum value and the minimum value of the division photometering values.

In accordance with the camera having the auxiliary photographing function of the present invention, the predetermined value to be added or subtracted is calculated based on the constant given for each mode.

In accordance with the camera having the auxiliary photographing function of the present invention, the exposure value is calculated by combining the exposure value derived by finely dividing the area to be photographed and the exposure value derived by coarsely dividing the area, in accordance with the predetermined contribution factor.

In accordance with the camera having the auxiliary photographing function of the present invention, the predetermined value is added or subtracted when the scenery mode is selected.

In accordance with the camera having the auxiliary photographing function of the present invention, the predetermined value is added or subtracted when the silhouette mode is selected.

DETAILED DESCRIPTION OF THE PREFERRED EMBODIMENTS

The preferred embodiments of the present invention are now explained in detail with reference to the drawings.

Figures 1, 2:
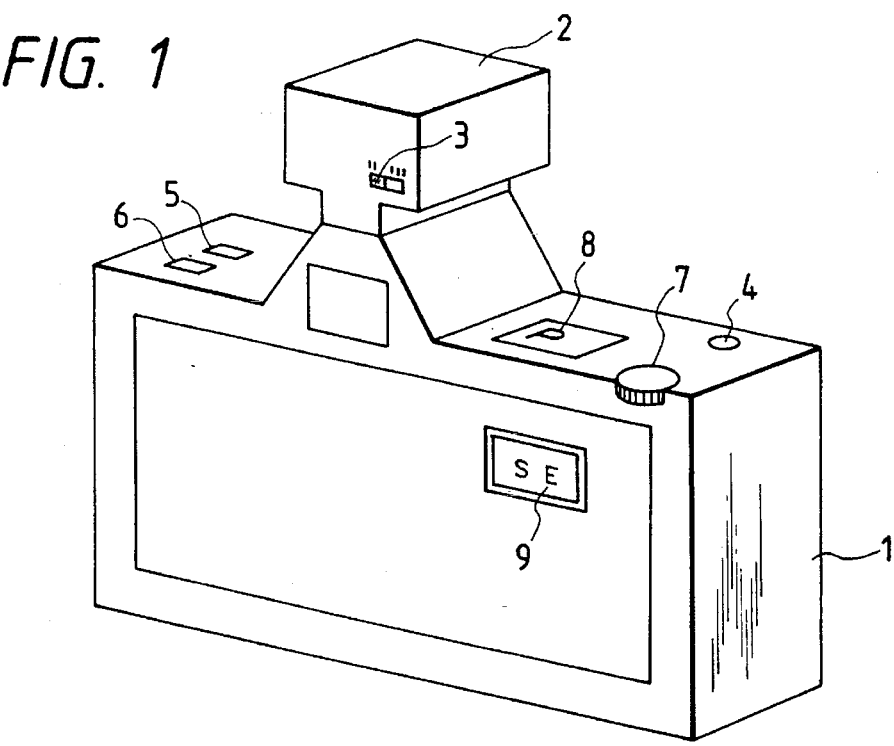
FIG. 1 shows a perspective view of one embodiment of a camera having an auxiliary photographing function of the present invention.
FIG. 2 shows photographing modes to be set by photographing mode setting means.

FIG. 1 shows one embodiment of the camera having the auxiliary photographing function of the present invention. Numeral 1 denotes a camera body, and numeral 2 denotes a flash device including a stroboscope. In the present embodiment, the flash device is removably mounted on the camera body 1, although it may be built in the camera body 1.

Numeral 3 denotes a switch arranged in the flash device 2 to enable or inhibit the flashing. Usually, it is a power switch for the stroboscope. Numeral 4 denotes a release button. Numeral 5 denotes an exposure mode selection button which allows the selection of a program mode, a diaphragm priority mode, a shutter priority mode and a manual mode.

Numeral 6 denotes a photographing mode selection button for selecting a photographing mode. It allows the selection of a silhouette mode, a scenery mode, a sports mode, a portrait mode, a memorial photographing mode and a close-up mode.

Numeral 7 denotes a command dial. When the command dial 7 is turned while the exposure mode selection button 5 is depressed, the exposure mode changes from the program mode to the diaphragm priority mode, the shutter priority mode, the manual mode and the program mode.

When the command dial 7 is turned while the photographing mode selection button 6 is depressed, the photographing mode changes from the silhoutte mode to the scenery mode, the sports mode, the portrait mode, the memorial photographing mode, the close-up mode and the silhouette mode.

Numeral 8 denotes an exposure mode display which displays P when the program mode is selected, A when the diaphragm priority mode is selected, S when the shutter priority mode is selected, and M when the manual mode is selected.

Numeral 9 denotes a photographing mode display which displays SE when the silhouette mode is selected, LS when the scenery mode is selected, SP when the sports mode is selected, PR when the portrait mode is selected, PF when the memorial photographing mode is selected, and CU when the close-up mode is selected.

FIG. 2 shows the content of the photographing modes settable by the photographing mode setting button 6. "MODE" represents the name of mode to be set by the photographing mode setting button 6. "DISP" represents the content displayed on the photographing mode display 9. "STATI LIT" represents an algorithm to be used when the flash device 2 is not used. The detail thereof will be explained later with reference to FIGS. 7 to 15. "FL LIT" represents an algorithm to be used when the flash device 2 is used. The detail thereof will be explained later with reference to FIG. 16. "PROG DIAG—NATR LIT" represents a program diagram when the flash device 2 is not used. The detail thereof will be explained later with reference to FIG. 17. "PROG DIAG—FL LIT" represents a program diagram when the flash device 2 is used. The detail thereof will be explained later with reference to FIG. 17.

Figure 3:
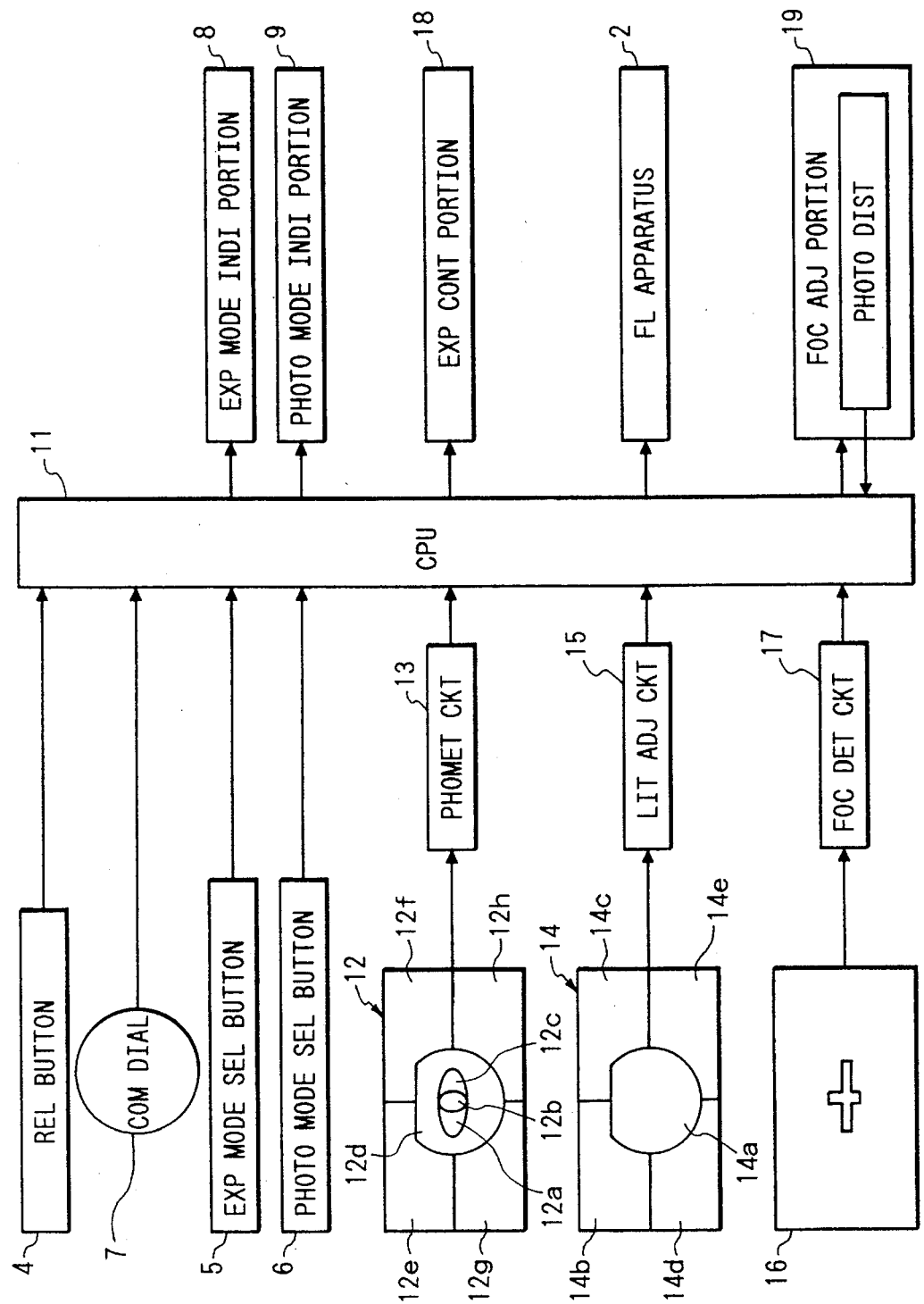
FIG. 3 shows a block diagram of the camera having the auxiliary photographing function shown in FIG. 1.

FIG. 3 shows a block diagram of the camera having the auxiliary photographing function of the present embodiment. Numeral 11 denotes a CPU. Numeral 12 denotes a stationary light photometering device. The photometering is conducted by dividing a finder view field into eight areas 12a–12h. Numeral 13 denotes a photometering circuit which logarithmically compresses the output of the stationary light photometering device 12 to convert it to a brightness signal, which is supplied to the CPU 11.

In the present embodiment, the brightness signal for the photometered output of 12a is represented by BV(1), the brightness signal for the photometered output of 12b is represented by BV(2), the brightness signal for the photometered output of 12c is represented by BV(3), the brightness signal for the photometered out of 12d is represented by BV(4), the brightness signal for the photometered output of 12e is represented by BV(5), the brightness signal for the photometered output of 12f is represented by BV(6), the brightness signal for the photometered output of 12g is represented by BV(7), and the brightness signal for the photometered output of 12h is represented by BV(8).

Numeral 14 denotes a flash light (stroboscope light) photometering device. In the present embodiment, the photometering is conducted by dividing the finder view field into five areas 14a–14e.

Numeral 15 denotes a light control circuit which integrates the output of the flash light photometering device 14 and supplies an output thereof to the CPU 11. Numeral 16 denotes a focus detection device. In the present embodiment, it detects a cross-shape in the vicinity of the center of the field. Numeral 17 denotes a focus detection circuit which detects a focus status based on the output from the focus detection device 16 and supplies an output thereof to the CPU 11. Numeral 18 denotes an exposure control unit which controls a shutter and a diaphragm (not shown) in accordance with the proper exposure value processed by the CPU 11 based on the output of the photometering circuit 13. Numeral 19 denotes a focus adjusting unit which drives a photographing lens by a motor (not shown) in accordance with the focus deviation and the direction thereof processed by the CPU 11 based on the output of the focus detection circuit 17.

Figure 4:
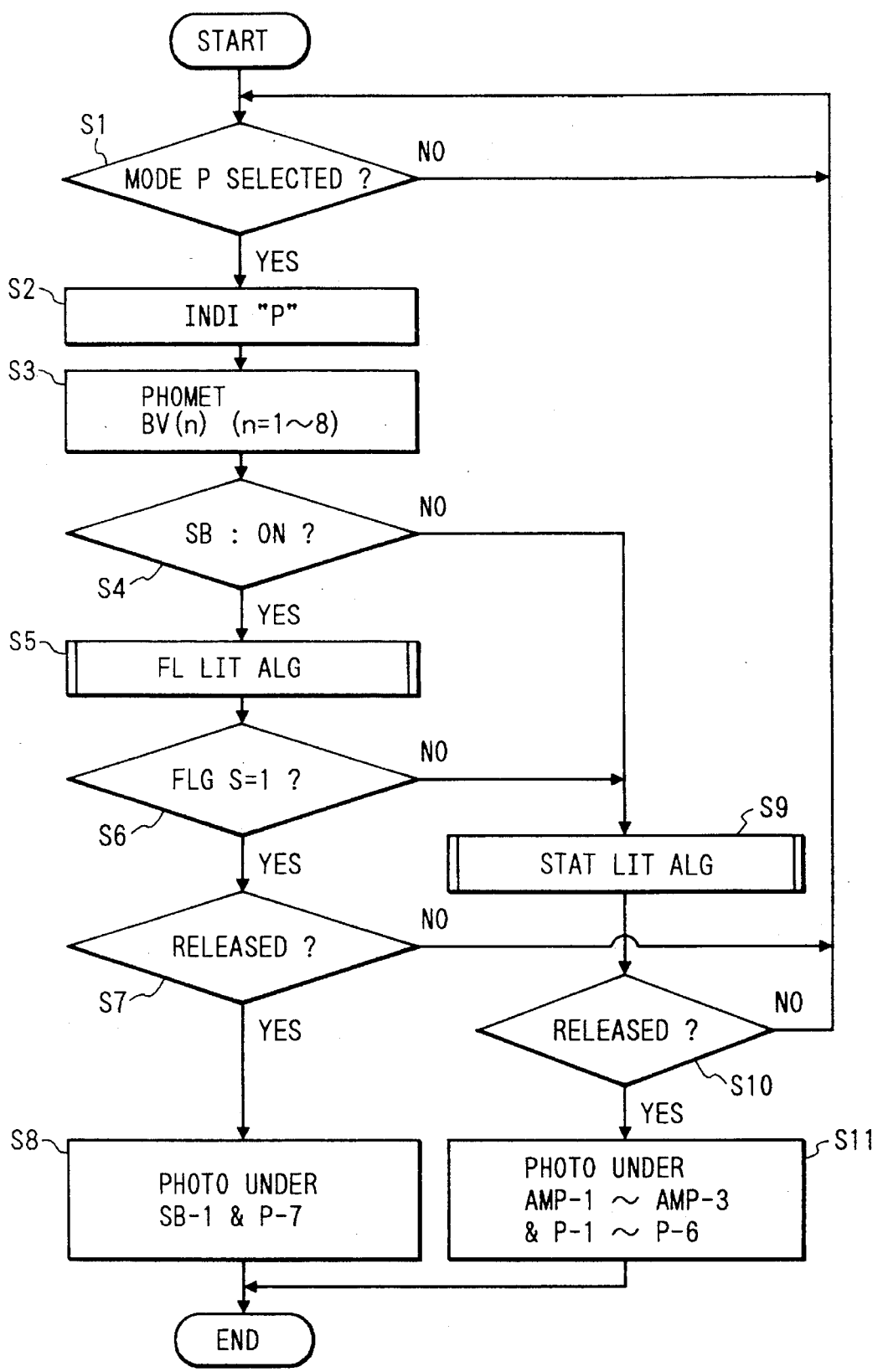
FIG. 4 shows a flow chart of a main algorithm of an operation of a CPU in the camera having the auxiliary photographing function of FIG. 3.

FIG. 4 shows a main algorithm of the operation of the present embodiment primarily conducted by the CPU 11.

Step S1: Whether the program mode has been selected by the exposure mode selection button 5 or not is determined. If it has, the process proceeds to a step S2, and if it has not, the process returns to the step S1.

Step S2: The program mode mark "P" is displayed on the exposure mode display 8.

Step S3: The object is photometered by the stationary light photometering device 12, and the output thereof is processed by the photometering circuit 13 to produce BV(1)–BV(8).

Step S4: Whether the switch 3 to enable or inhibit the flashing of the flash device (stroboscope) 2 is in the ON position or not is determined. If it is in the ON position, the process proceeds to a step S5, and if it is in the OFF position, the process proceeds to a step S9.

Step S5: Various conditions are determined by the flash algorithm. The detail thereof will be explained later with reference to FIG. 5.

Step S6: Whether FLGS=1 or not in the step S5 is determined. If FLGS=1, the process proceeds to a step S7, and if FLGS=0, the process proceeds to a step S9.

In the silhouette mode, FLGS=1 is not met. In this mode, the flash photographing makes no sense and the flashing is inhibited even if the switch 3 for enabling or inhibiting the flashing of the flash device (stroboscope) 2 is in the ON position, and the process proceeds to a stationary light algorithm step S9.

Step S7: Whether the release button 4 has been depressed or not is determined. When it has, the process proceeds to a step S8, and when it has not been depressed, the process returns to the step S1.

Step S8: The photographing is terminated. The photographing condition is SB-1, P-7 selected in the flash algorithm step S5.

Step S9: Various conditions are determined by the stationary light algorithm. The detail thereof is explained later with reference to FIG. 6.

Step S10: Whether the release button has been depressed or not is determined. If it has, the process proceeds to a step S11, and if it has not, the process returns to the step S1.

Step S11: The photographing is terminated. The photographing condition is AMP-1–AMP-3, P-1–P-6 selected in the stationary light algorithm step S9

Figure 5B:
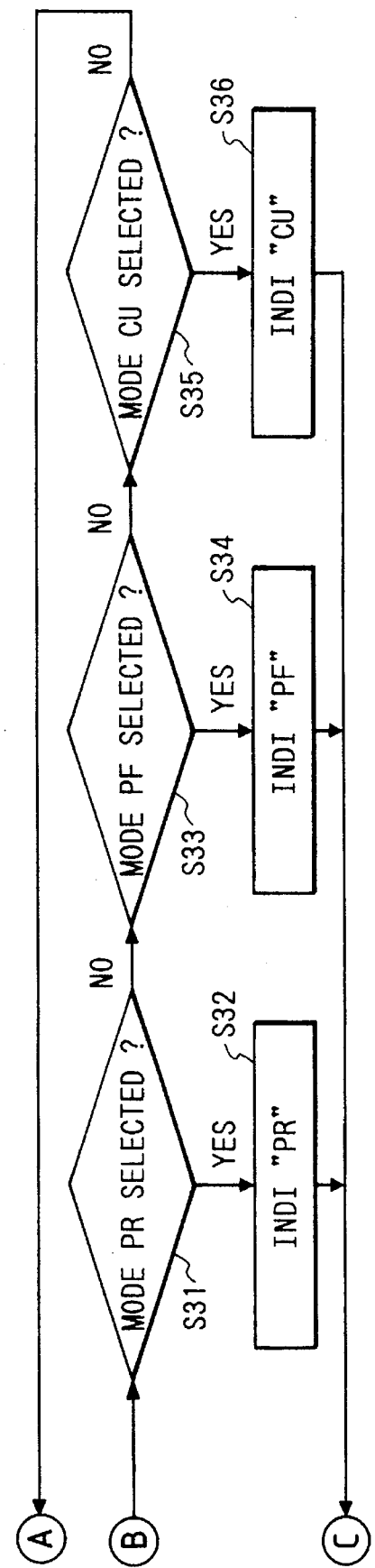
FIG. 5 shows a detailed flow chart of a flashing algorithm in a step S5 of FIG. 4.

FIG. 5 shows the detail of the flash algorithm in the step S5 shown in FIG. 4.

Step S21: Whether the silhouette mode has been selected by the photographing mode selection button 6 or not is determined. If it has, the process proceeds to a step S22, and if it has not, the process proceeds to a step S24.

Step S22: The silhouette mode mark "SE" is displayed on the photographing mode display 9. The flashing is inhibited and the process proceeds to a step S23.

Step S23: FLGS is set to "0".

Step S24: Whether the scenery mode has been set by the photographing mode selection button 6 or not is determined. If it has, the process proceeds to a step S25, and if it has not, the process proceeds to a step S29.

Step S25: The scenery mode mark "LS" is displayed on the photographing mode display 9.

Step S26: SB-1 is selected as the flash algorithm. The detail of the SB-1 will be explained later with reference to FIG. 16. The SB-1 is implemented in the step S8. It is merely selected in this step.

Step S27: P-7 is selected as the program diagram. The detail of the P-7 will be explained later with reference to FIG. 17.

Step S28: FLGS is set to "1".

Step S29: Whether the sports mode has been selected by the photographing mode selection button 6 or not is determined. If it has, the process proceeds to a step S30, and if it has not, the process proceeds to a step S31.

Step S30: The sports mode mark "SP" is displayed on the photographing mode display 9.

Step S31: Whether the portrait mode has been selected by the photographing mode selection button 6 or not is determined. If it has, the process proceeds to a step S32, and if it has not, the process proceeds to a step S33.

Step S32: The portrait mode mark "PR" is displayed on the photographing mode display 9.

Step S33: Whether the memorial photographing mode has been selected by the photographing mode selection button 6 or not is determined. If it has, the process proceeds to a step S34, and if it has not, the process proceeds to a step S35.

Step S34: The memorial photograph mode mark "PF" is displayed on the photographing mode display 9.

Step S35: Whether the close-up mode has been selected by the photographing mode selection button 6 or not is determined. If it has, the process proceeds to a step S36, and if it has not, the process proceeds to a step S21.

Step S36: The close-up mode mark "CV" is displayed on the photographing mode display 9.

Figure 6B:
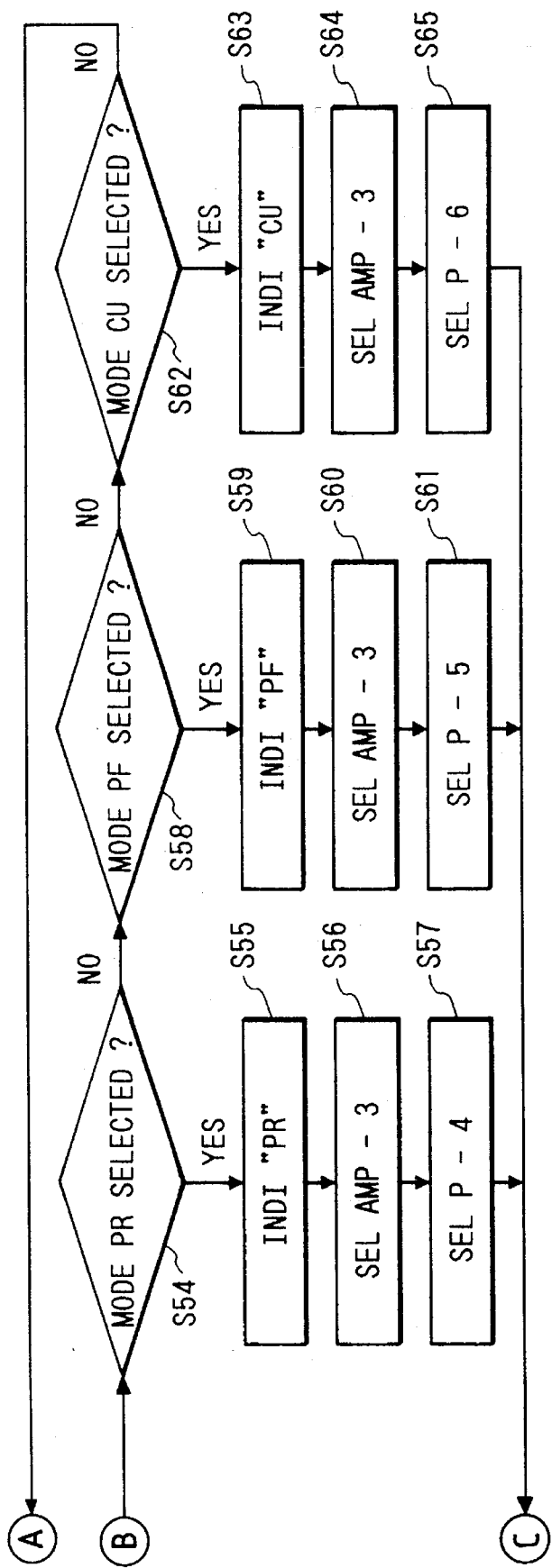
FIG. 6 shows a detailed flow chart of a stationary light algorithm in a step S9 of FIG. 4.

FIG. 6 shows the detail of the stationary light algorithm in the step S9 shown in FIG. 4.

Step S41: Whether the silhouette mode has been selected by the photographing mode or not is determined. If it has, the process proceeds to a step S42, and if it has not, the process proceeds to a step S46.

Step S42: The silhouette mode mark "SE" is displayed on the photographing mode display 9.

Step S43: AMP-1 is selected as the stationary light algorithm. The detail of the AMP-1 will be explained later with reference to FIG. 14. The AMP-1 is implemented in the step S11. It is merely selected in this step.

Step S44: P-1 is selected as the program diagram. The detail of the P-1 will be explained later with reference to FIG. 17.

Step S45: FLGS is set to "0".

Step S46: Whether the scenery mode has been selected by the photographing mode selection button 6 or not is determined. If it has, the process proceeds to a step S47, and if it has not, the process proceeds to a step S50.

Step S47: The scenery mode mark "LS" is displayed on the photographing mode display 9.

Step S48: AMP-2 is selected as the stationary light algorithm. The detail of the AMP-2 will be explained later with reference to FIG. 15. The AMP-2 is implemented in the step S11. It is merely selected in this step.

Step S49: P-2 is selected as the program diagram. The detail of the P-2 will be explained later with reference to FIG. 17.

Step S50: Whether the sports mode has been selected by the photographing mode selection button 6 or not is determined. If it has, the process proceeds to a step S51, and if it has not, the process proceeds to a step S54.

Step S51: The sports mode mark "SP" is displayed on the photographing mode display 9.

Step S52: AMP-3 is selected as the stationary light algorithm. The detail of the AMP-3 will be explained later with reference to FIGS. 7–13. The AMP-3 is implemented in the step S11. It is merely selected in this step.

Step S53: P-3 is selected as the program diagram. The detail of the P-3 will be explained later with reference to FIG. 17.

Step S54: Whether the portrait mode has been selected by the photographing mode selection button 6 or not is determined. If it has, the process proceeds to a step S55, and if it has not, the process proceeds to a step S58.

Step S55: The portrait mode mark "PR" is displayed on the photographing mode display 9.

Step S56: AMP-3 is selected as the stationary light algorithm. The detail of the AMP-3 will be explained later with reference to FIGS. 7–13. The AMP-3 is implemented in the step S11. It is merely selected in this step.

Step S57: P-4 is selected as the program diagram. The detail of the P-4 will be explained later with reference to FIG. 17.

Step S58: Whether the memorial photograph mode has been selected by the photographing mode selection button 6 or not is determined. If it has, the process proceeds to a step S59, and if it has not, the process proceeds to a step S62.

Step S59: The memorial photograph mode "PF" is displayed on the photographing mode display 9.

Step S60: AMP-3 is selected as the stationary light algorithm. The detail of the AMP-3 will be explained later with reference to FIGS. 7–13. The AMP-3 is implemented in the step S11. It is merely selected in this step.

Step S61: P-5 is selected as the program diagram. The detail of the P-5 will be explained later with reference to FIG. 17.

Step S62: Whether the close-up mode has been selected by the photographing mode selection button 6 or not is determined. If it has, the process proceeds to a step S63, and if it has not, the process returns to the step S41.

Step S63: The close-up mode mark "CU" is displayed on the photographing mode display 9.

Step S64: AMP-3 is selected as the stationary light algorithm. The detail of the AMP-3 will be explained later with reference to FIGS. 7–13. The AMP-3 is implemented in the step S11. It is merely selected in this step.

Step S65: P-6 is selected as the program diagram. The detail of the P-6 will be explained later with reference to FIG. 17.

Figure 7:
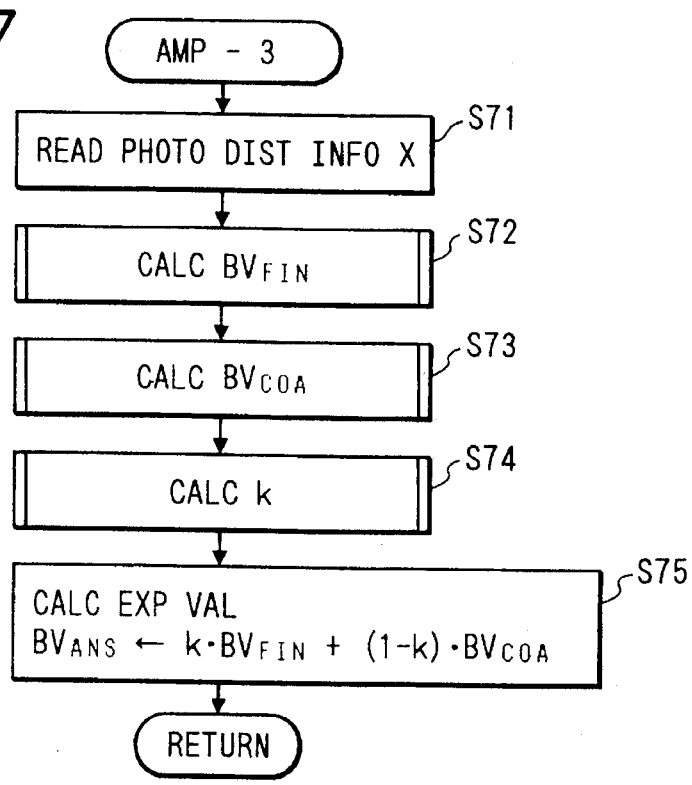
FIG. 7 shows a flow chart of a main algorithm of LMP-3.

FIG. 7 shows a main algorithm of the AMP-3.

Step S71: Photographing distance information X is read.

Step S72: Fine division photometering calculation is carried out. The detail thereof will be explained later with reference to FIG. 8. A calculation result is represented by $BV_{FIN}$.

Step S73: Coarse division photometering calculation is carried out. The detail thereof will be explained later with reference to FIG. 9. A calculation result is represented by $BV_{COA}$.

Step S74: A contribution factor is calculated. The detail thereof will be explained later with reference to FIGS. 10–13. A calculation result is represented by k.

Step S75: (Final) exposure calculation is carried out. A calculation result is represented by $BV_{ANS}$, which is given by $$BV_{ANS} = k \cdot BV_{FIN} + (1-k) \cdot BV_{COA}$$

Figure 8:
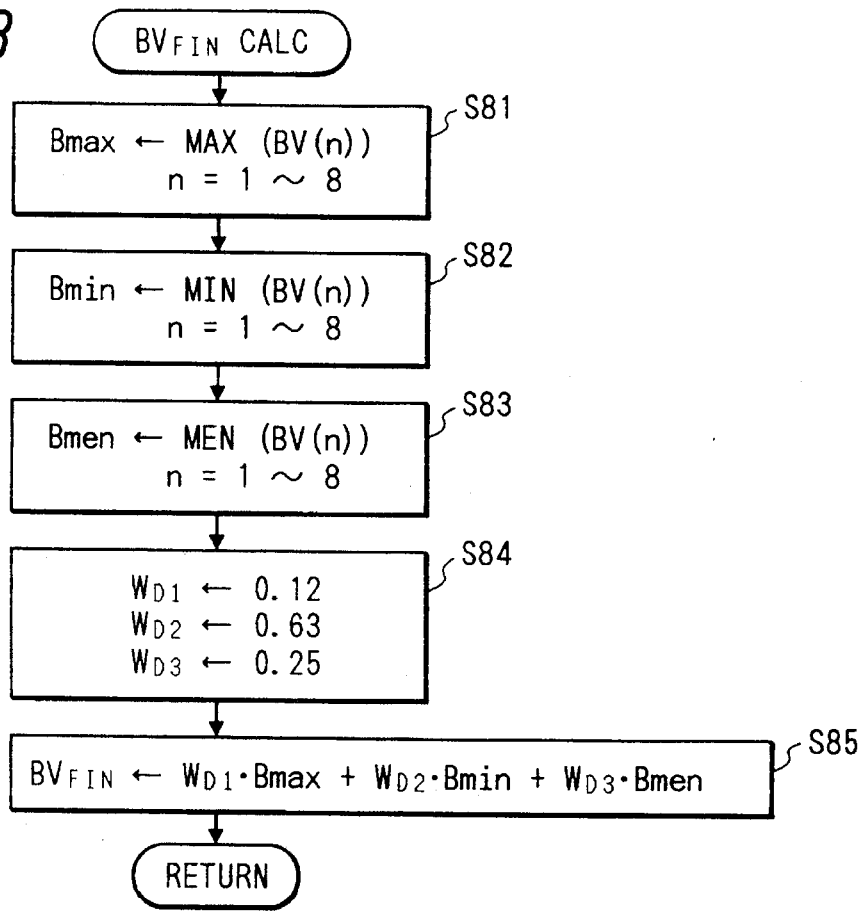
FIG. 8 shows a detailed flow chart of fine division photometering calculation in a step S72.

FIG. 8 shows the detail of the fine division photometering calculation in the step S72 of FIG. 7.

Step S81: A maximum brightness of eight brightness signals is represented by $B_{max}$.

Step S82: A minimum brightness of the eight brightness signals is represented by $B_{min}$.

Step S83: A mean brightness of the eight brightness signals is represented by $B_{men}$.

Step S84: Weighting factors are determined. In the present example, $W_{D1}=0.12$, $W_{D2}=0.63$ and $W_{D3}=0.25$.

Step S85: A fine division exposure value is calculated. A calculation result is represented by $BV_{FIN}$, which is given by $$BV_{FIN} = W_{D1} \cdot B_{max} + W_{D2} \cdot B + W_{D3} \cdot B_{men}$$

Figure 9:
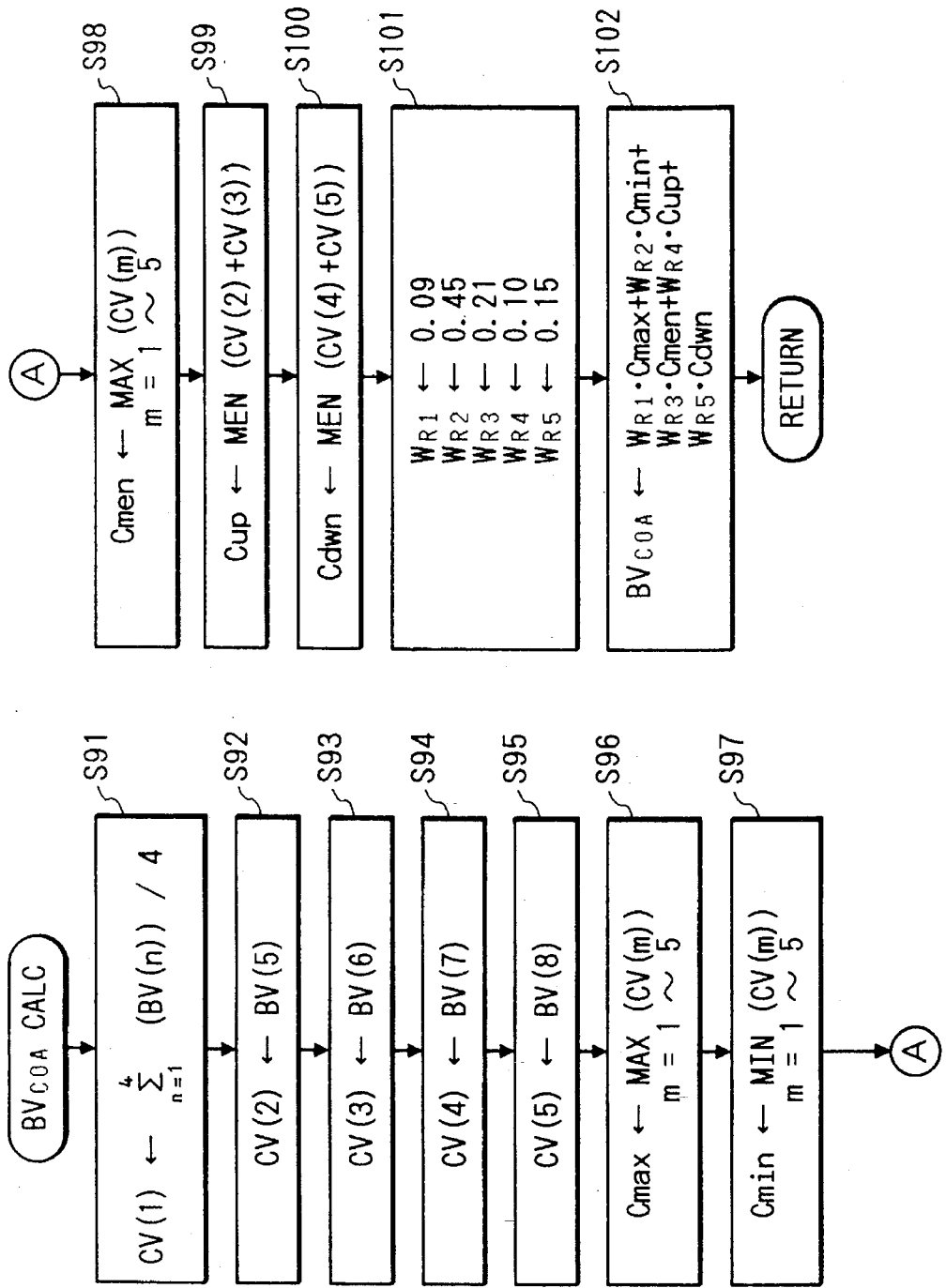
FIG. 9 shows a detailed flow chart of coarse division photometering calculation in a step S73.

FIG. 9 shows the detail of the coarse division photometering calculation in the step S73 shown in FIG. 7.

Step S91: The brightness signals of the four areas BV(1)–BV(4) are combined into one brightness signal by averaging them by the addition of the brightness signals. The combined brightness is represented by CV(1).

Step S92: BV(5) is substituted by CV(2).

Step S93: BV (6) is substituted by CV (3).

Step S94: BV (7) is substituted by CV (4).

Step S95: BV(8) is substituted by CV(5).

Step S96: A maximum brightness of the five brightness signals CV(1)–CV(5) is represented by $C_{max}$.

Step S97: A minimum brightness of the five brightness signals CV(1)–CV(5) is represented by $C_{min}$.

Step S98: A mean brightness of the five brightness signals CV(1)–CV(5) is represented by $C_{men}$.

Step S99: A mean brightness of the two brightness signals CV(2)–CV(3) at the top of the field is represented by $C_{up}$.

Step S100: A mean brightness of the two brightness signals at the bottom of the field is represented by $C_{dwn}$.

Step 101: Weighting factors are set. $W_{R1}=0.09$, $W_{R2}=0.45$, $W_{R3}=0.21$, $W_{R4}=0.10$, and $W_{R5}=0.15$.

Step S102: A coarse division exposure value is calculated. A calculation result is represented by $BV_{COA}$ which is given by $$B_{COA} = W_{R1} \cdot C_{max} + W_{R2} \cdot C_{min} + W_{R3} \cdot C_{men} + W_{R4} \cdot C_{up} + W_{R5} \cdot C_{dwn}$$

Figure 10:
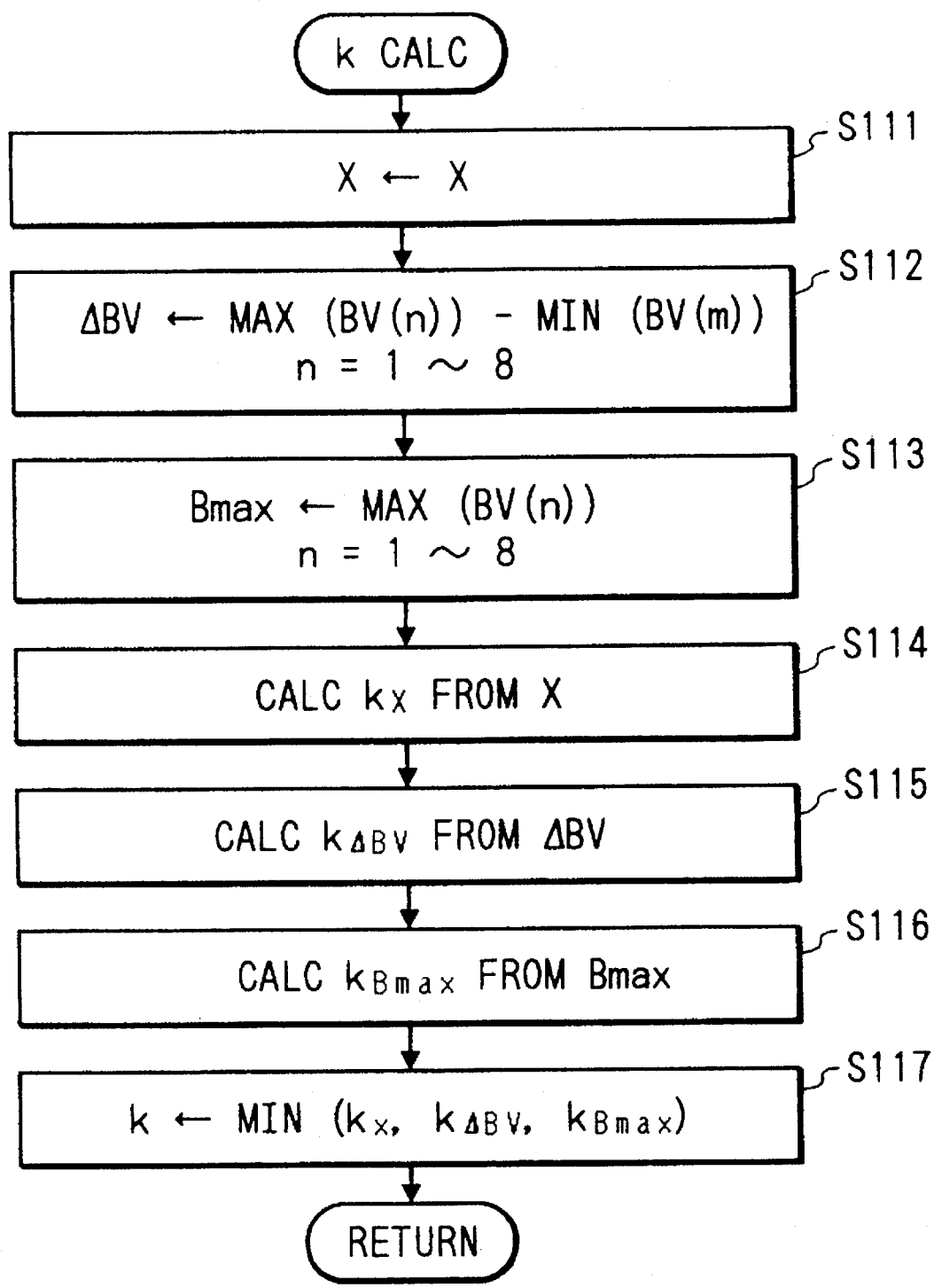
FIG. 10 shows a detailed flow chart of contribution factor calculation in a step S74.

FIG. 10 shows the detail of the contribution factor calculation in the step S74 shown in FIG. 7.

Step S111: The photographing distance X is set to X.

Step S112: A brightness difference is calculated. The brightness difference $\Delta BV$ between the maximum brightness and the minimum brightness of the eight brightness signals is calculated.

Step S113: The maximum brightness is detected. The maximum brightness of the eight brightness signals is represented by $B_{max}$.

Step S114: An adaptability factor kx is calculated. The adaptability factor kx is calculated based on the photographing distance X in accordance with FIG. 11.

Step S115: An adaptability factor $k\Delta BV$ is calculated. The adaptability factor $k\Delta BV$ is calculated based on the brightness difference $\Delta BV$ in accordance with FIG. 12.

Step S116: An adaptability factor $kB_{max}$ is calculated. The adaptability factor $kB_{max}$ is calculated based on the maximum brightness $B_{max}$ in accordance with FIG. 13.

Step S117: A contribution factor k is calculated. The contribution factor k is a minimum of the adaptability factors kx, $k\Delta BV$ and $kB_{max}$.

Figure 11:
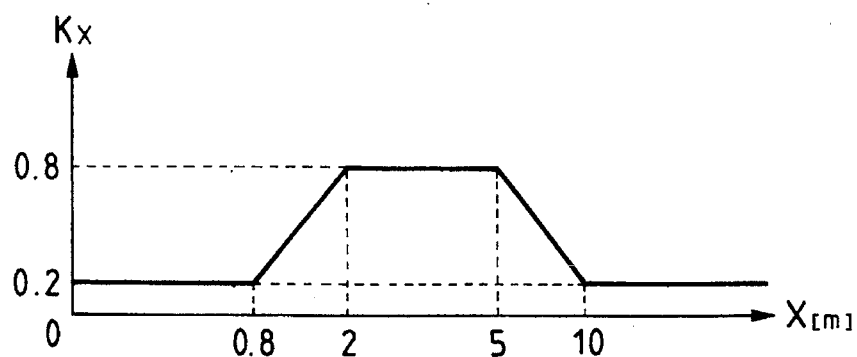
FIG. 11 illustrates a membership function in fuzzy calculation.

FIG. 11 shows a membership function to the photographing distance in the fuzzy calculation.

The photographing distance X is on an abscissa, and the adaptability factor kx is on an ordinate. The adaptability factor kx is high when the photographing distance X is in a middle range, and the fine division photometering calculation value significantly contributes under this condition.

Figure 12:
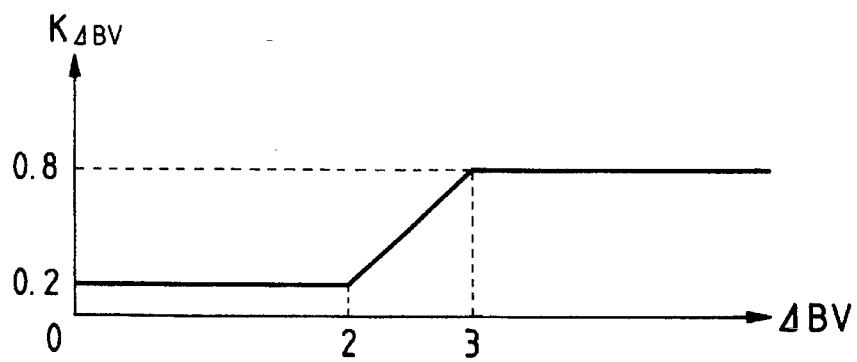
FIG. 12 illustrates a membership function in fuzzy calculation.

FIG. 12 shows a membership function to the brightness difference in the fuzzy calculation.

The brightness difference $\Delta BV$ is on the abscissa, and the adaptability factor k$\Delta BV$ is on ordinate. The adaptability factor k$\Delta BV$ is high when the brightness difference $\Delta BV$ is large, and the fine division photometering calculation value significantly contributes under this condition.

Figure 13:
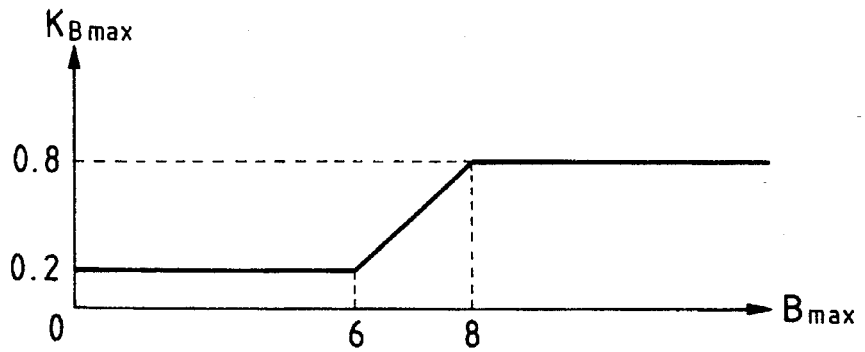
FIG. 13 illustrates a membership function in fuzzy calculation, FIGS. 14 and 15 respectively show flow charts of a main algorithm of AMP-1 and AMP-2.

FIG. 13 shows a membership function to the maximum brightness in the fuzzy calculation.

The maximum brightness $B_{max}$ is on the abscissa and the adaptability k$\Delta_{max}$ is on the ordinate. The adaptability k$\Delta_{max}$ is high when the maximum brightness $B_{max}$ is large, and the fine division photometering calculation value significantly contributes under this condition.

Figure 14:
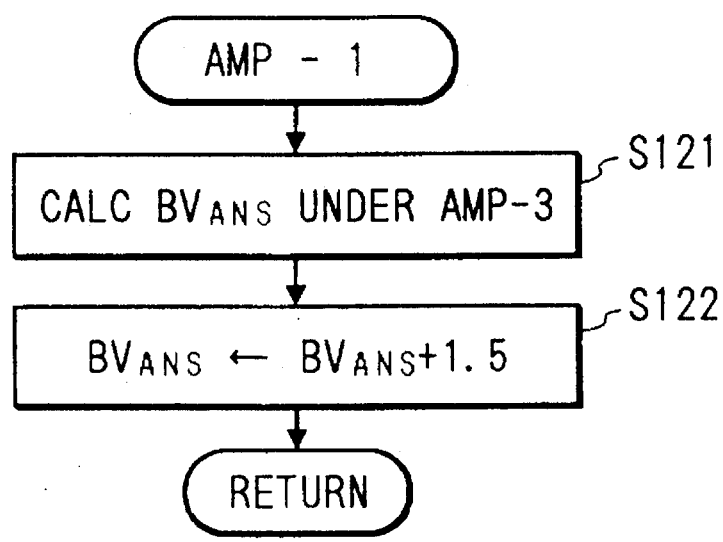

FIG. 14 shows a main algorithm of the AMP-1.

Step S121: The AMP-3 is calculated. The calculation result is represented by $BV_{ANS}$. The content of the AMP-3 is shown in FIGS. 7–13.

Step S122: 1.5 is added to $BV_{ANS}$ derived in the step S121, and the sum replaces $BV_{ANS}$. Since the AMP-1 is selected in the silhouette mode, the predetermined value is added to the calculation result of the step S121 to calculate the proper exposure value for the silhouette.

Figure 15:
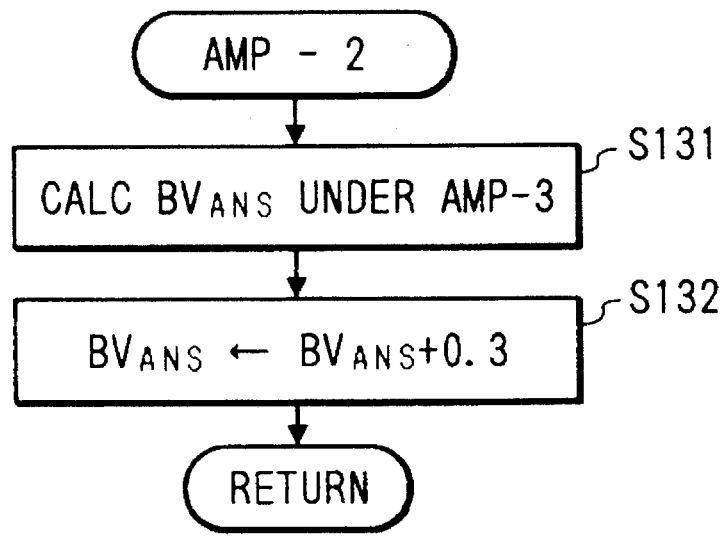

FIG. 15 shows a main algorithm of the AMP-2.

Step S131: The AMP-3 is calculated. The content of the AMP-3 is shown in FIGS. 7–13.

Step S132: 0.3 is added to $BV_{ANS}$ derived in the step S131 and the sum replaces $BV_{ANS}$. Since the AMP-2 is selected in the scenery mode, the predetermined value is added to the calculation result of the step S131 to calculate the proper exposure value for the scenery.

Figure 16:
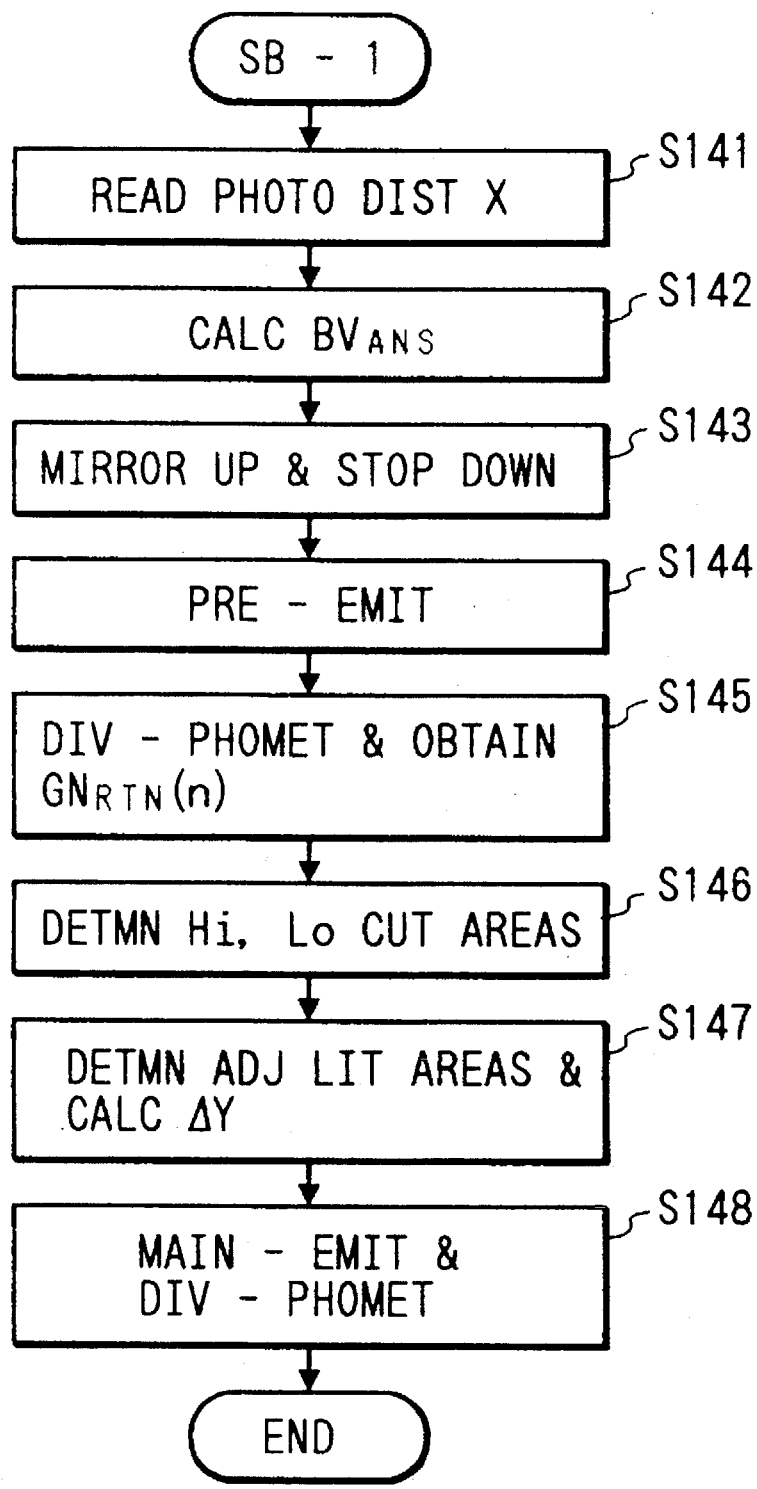
FIG. 16 shows a detailed flow chart of SB-1.

FIG. 16 shows a flow chart of the SB-1.

Step S141: The photographing distance X is read. The photographing distance X may be derived by detecting the position of the lens driven by an auto-focusing device by an encoder when the release button is partially depressed.

Step S142: Stationary light exposure calculation is carried out. The calculation result is represented by $BV_{ANS}$. The calculation may be made by the method disclosed in FIG. 7 of U.S. Pat. No. 4,965,620 assigned to the present assignee.

Step S143: A main mirror is driven up and the diaphragm is reduced.

Step S144: Preliminary light emission is effected.

Step S145: A reflected light from a shutter curtain of the preliminary light emission is photometered by the division photometering.

Step S146: Candidates for cut area (an area not subject of light control) are extracted in accordance with the photometering result for the preliminary light emission.

Step S147: A light control area is determined, and a light correction amount $\Delta Y$ is determined.

Step S148: The shutter is fully opened and a primary light emission is effected. A reflected light from a film surface is detected by the division photometering. The detail thereof is disclosed in U.S. patent application Ser. No. 789,967 assigned to the present assignee.

Figure 17:
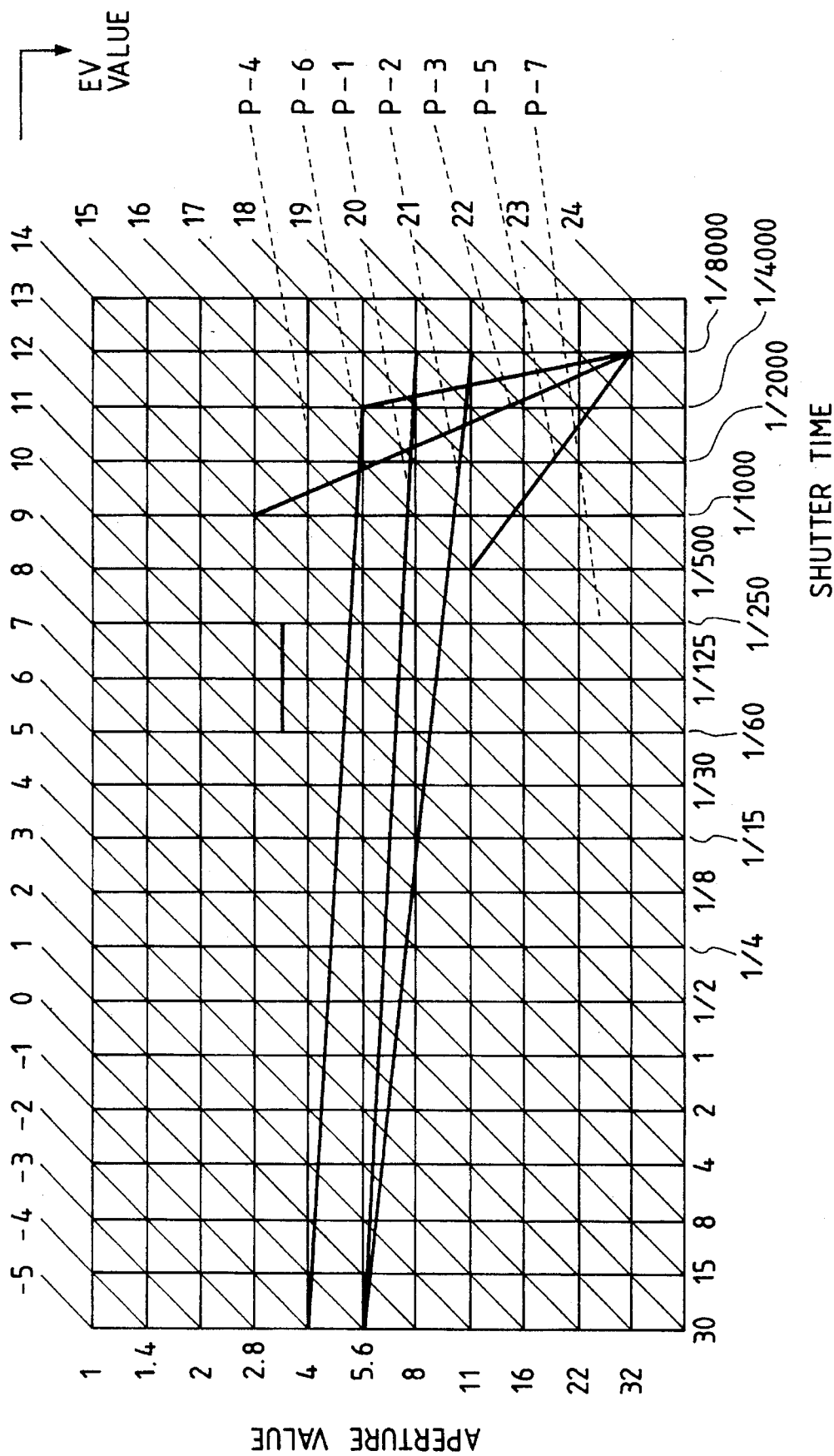
FIG. 17 shows a program diagram of the camera having the auxiliary photographing function shown in FIG. 1.

FIG. 17 shows a program diagram. An abscissa represents a shutter speed and an ordinate represents a diaphragm aperture. Thick lines show the program diagram. Seven proper diagrams (P-1–P-7) for the modes of silhouette, scenery and sports are shown.

In the camera having the auxiliary photographing function of the present invention, the predetermined value is added to the normal exposure value in accordance with the selected photographing mode to determine the final exposure value. Accordingly, the proper exposure values are assured to the scenery scene and the silhouette scene.

In the present camera having the auxiliary photographing function, the area to be photographed is divided into a plurality of areas, which are photometered. The final exposure value may exceed the range defined by the maximum value and the minimum value of the division photometering values so that proper exposure values are assured for the scenery scene and the silhouette scene.

Further, in the present camera having the auxiliary photographing function, the predetermined value to be added is calculated based on the constant given for each mode. Accordingly, the proper exposure value for the given photographing mode is assured.

The exposure value is calculated by combining the exposure value derived by finely dividing the area to be photographed and the exposure value derived by coarsely dividing the area in accordance with the predetermined contribution factor, and the predetermined value to be added is calculated based on the contribution factor for each mode. Accordingly, the proper exposure value for the given photographing mode is further assured.

Since the predetermined value is added when the scenery mode is selected, the proper exposure value is assured to the scenery scene for which slightly under-exposure is usually preferable.

Further, since the predetermined value is added when the silhouette mode is selected, the proper exposure value is assured to the silhouette scene in which blacking of the object is a primary requirement.

Figure 18:
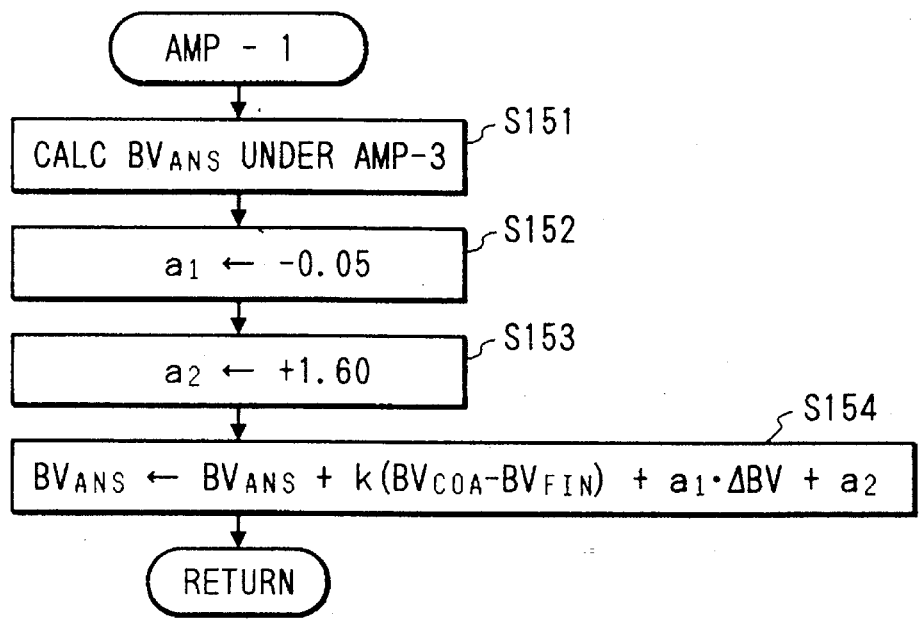
FIG. 18 shows a flow chart of a main algorithm of AMP-1 in another embodiment of the present invention.

FIG. 18 shows a main algorithm of the AMP-1 in another embodiment of the camera having the auxiliary photographing function of the present invention.

Step S151: The AMP-3 is calculated. The calculation result is represented by $BV_{ANS}$. The content of the AMP-3 is shown in FIGS. 7–13.

Step S152: Parameter $a_1$ is set to −0.05.

Step S153: Parameter $a_2$ is set to +1.60.

Step S154: A predetermined amount $k(BV_{COA}-BV_{FIN})+a_1.\Delta BV+a_2$ is added to $BV_{ANS}$ derived in the step S151, and the sum replaces $BV_{ANS}$.

Since the AMP-1 is selected in the silhouette mode, the predetermined value is added to the calculation result of the step S151 to calculate the proper exposure value for the silhouette.

In the camera having the auxiliary photographing function of the present embodiment, substantially the same effects as those of the previous embodiment are attained.

Figure 19:
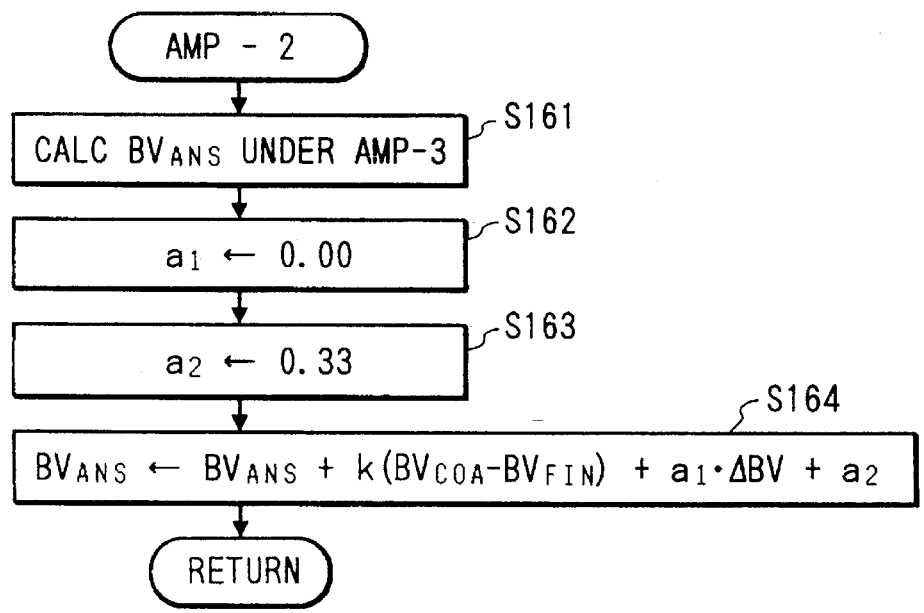
FIG. 19 shows a flow chart of a main algorithm of AMP-2 in the other embodiment of the present invention.

FIG. 19 shows a main algorithm of the AMP-2 in other embodiment of the camera having the auxiliary photographing function of the present invention.

Step S161: The AMP-3 is calculated. The calculation result is represented by $BV_{ANS}$. The content of the AMP-3 is shown in FIGS. 7–13.

Step S162: Parameter $a_1$ is set to 0.00.

Step S163: Parameter $a_2$ is set to +0.33.

Step S164: A predetermined value $k(BV_{COA}-BV_{VIN})+a_1.\Delta BV+a_2$ is added to $BV_{ANS}$ derived in the step S161, and the sum replaces $BV_{ANS}$.

Since the AMP-2 is selected in the scenery mode, the predetermined value is added to the calculation result of the step S131 to calculate the proper exposure value for the scenery.

In the camera having the auxiliary photographing function of the present embodiment, substantially the same effects as those of the previous embodiments are attained.

In the algorithms of the AMP-1 and AMP-2 of the two embodiments described above, the predetermined value is added to the exposure value calculated by the AMP-3. The exposure value is based on the brightness value BV(n) derived in the step S3 in FIG. 3. Alternatively, it may be calculated in the following manner.

When the silhouette mode or the scenery mode is selected by the photographing mode selection button 6, a predetermined value is added to the brightness value BV(n) derived from the photometering circuit 13 to calculate a brightness value $BV(n)^{1,2}$, which is used to calculate a final exposure value.

In accordance with the camera having the auxiliary photographing function of the present invention, the predetermined value is added to or subtracted from the normal exposure value in accordance with the selected photographing mode to determine the final exposure value. Accordingly, the proper exposure is assured for the scenery scene and the silhouette scene.

In accordance with the camera having the auxiliary photographing function of the present invention, the photometering is effected by dividing the area to be photographed into a plurality of areas, and the final exposure value may exceed the range defined by the maximum value and the minimum value of the division photometering values. Accordingly, the proper exposure is assured for the scenery scene and the silhouette scene.

In accordance with the camera having the auxiliary photographing function of the present invention, the predetermined value to be added or subtracted is calculated based on the constant given for each mode. Accordingly, the proper exposure for the given photographing mode is assured.

In accordance with the camera having the auxiliary photographing function of the present invention, the exposure value is calculated by combining the exposure value derived by finely dividing the area to be photographed and the exposure value derived by coarsely dividing the area, in accordance with the predetermined contribution factor. Accordingly, the proper exposure for the given photographing mode is assured.

In accordance with the camera having the auxiliary photographing function of the present invention, the predetermined value is added or subtracted when the scenery mode is selected. Accordingly, the proper exposure is assured for the scenery scene for which the slightly under exposure is usually preferable.

In accordance with the camera having the auxiliary photographing function of the present invention, the predetermined value is added or subtracted when the silhouette mode is selected. Accordingly, the proper exposure is assured for the silhouette scene in which blackening of the object is a primary requirement.

What is claimed is:

1. A camera comprising:

photometering means for photometering an area to be photographed and outputting a luminance value;

exposure value calculation means for calculating an initial exposure value based on the luminance value outputted from said photometering means;

photographing mode selection means for selecting a photographing mode from a plurality of photographing modes corresponding, respectively, to different types of subjects to be photographed; and exposure value setting means for automatically setting a final exposure value different from said initial exposure value, according to said photographing mode selected by said photographing mode selection means.

2. A camera comprising:

photometering means for photometering an area to be photographed and outputting a luminance value;

exposure value calculation means for calculating an initial exposure value based on the luminance value outputted from said photometering means;

photographing mode selection means for selecting a photographing mode from a plurality of photographing modes corresponding, respectively, to different types of subjects to be photographed; and exposure value setting means for automatically setting a final exposure value by adding to or subtracting from the initial exposure value different non-zero values, each of which is determined by a corresponding mode selected by said photographing mode selection means.

3. A camera according to claim 2, wherein said photometering means has divided photometering areas corresponding to a plurality of areas, respectively, of a subject to be photographed, and outputs plural luminance values for the divided areas, respectively.

4. A camera according to claim 3 further comprising:

means for determining a photographing distance between a camera and a subject to be photographed;

means for determining maximum and minimum luminance values in the plural luminance values outputted from said photometering means;

means for determining a luminance difference between the maximum luminance value and the minimum luminance value; and means for calculating a contribution factor based on the photographing distance, the maximum luminance value, and the luminance difference;

wherein the values to be added or subtracted by said exposure value setting means are determined in accordance with the contribution factor.

5. A camera according to claim 3 further comprising:

means for determining a photographing distance between a camera and a subject to be photographed;

means for determining maximum and minimum luminance values in the plural luminance values outputted from said photometering means;

means for determining a luminance difference between the maximum luminance value and the minimum luminance value; and means for calculating a contribution factor based on the photographing distance, the maximum luminance value, and the luminance difference;

wherein said exposure value calculation means calculates a first exposure value based on the plural luminance values at the divided areas and a second exposure value based on the luminance values obtained by processing a part of the plural values, and combines the first and second exposure values in accordance with the contribution factor.

6. A camera according to claim 2 wherein the modes selectable by said photographing mode selection means include a mode in which the subject to be photographed is scenery and a mode in which the subject to be photographed is silhouetted.

7. A camera comprising:

a photometering device which measures light of an area to be photographed and outputs a luminance value;

an exposure value calculation circuit which calculates an initial exposure value based on the luminance value outputted from said photometering device;

a photographing mode selection system which selects a photographing mode from a plurality of photographing modes corresponding, respectively, to different types of subjects to be photographed; and an exposure value setting circuit which automatically sets a final exposure value different from said initial exposure value, according to the photographing mode selected by said photographing mode selection system.

8. A camera comprising:

a photometering device which measures light of an area to be photographed and outputs a luminance value;

an exposure value calculation circuit which calculates an initial exposure value based on the luminance value outputted from said photometering device;

a photographing mode selection system which selects a photographing mode from a plurality of photographing modes corresponding, respectively, to different types of subjects to be photographed; and an exposure value setting circuit which automatically sets a final exposure value by adding to or subtracting from the initial exposure value different non-zero values, each of which is determined by a corresponding mode selected by said photographing mode selection system.

* * * * *